July 12, 1938.   H. BECKER   2,123,495
MOTION PICTURE FILM CONTAINER
Filed Nov. 17, 1936
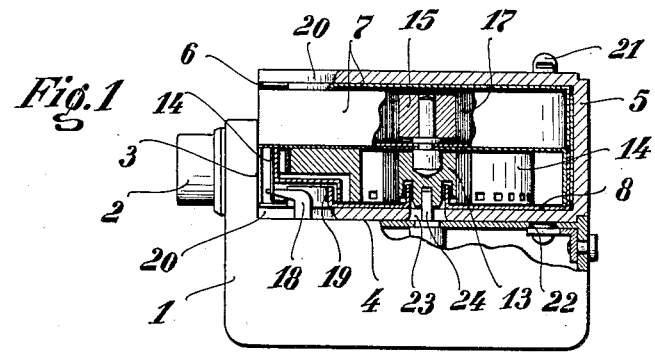
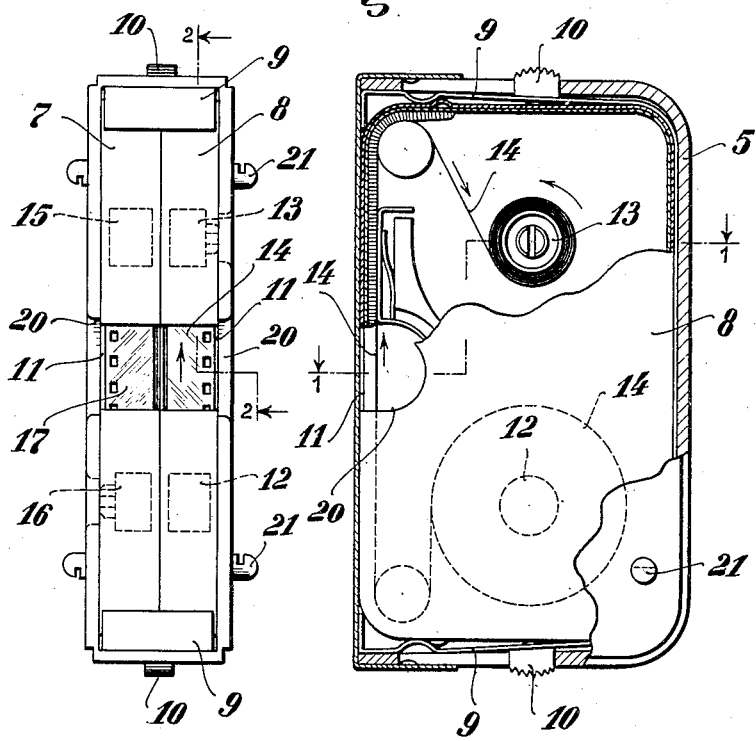
INVENTOR
Helmut Becker
BY
ATTORNEY Patented July 12, 1938

2,123,495

UNITED STATES PATENT OFFICE 2,123,495

MOTION PICTURE FILM CONTAINER

Helmut Becker, Wetzlar, Germany, assignor to Ernst Leitz, G. m. b. H., Wetzlar, Germany Application November 17, 1936, Serial No. 111,197
In Germany December 2, 1935

2 Claims. (Cl. 88—17)

This invention relates to improvements in motion picture film containers adapted to be attached to the outside of a camera which uses or is arranged for taking half size pictures. That is, the camera operates with films of half the width of standard motion picture films.

Half size pictures may be taken upon both standard width films and half width films. In the first case two series of pictures may be taken side by side upon the standard width film. The film is then placed in a single film casette and exposed twice for the two series of pictures. Or a standard film may be split lengthwise, placed in a narrower casette and used with a camera arranged for the taking of such half size pictures.

The use of a standard film for the taking of two series of pictures side by side has of course the advantage that a single casette then contains double the available film length. On the other hand there is the disadvantage that the film cannot be developed until both series of pictures have been taken. Then again, a casette containing a standard film may be used both on a standard width camera, or it may be attached to a camera using a half width film. Obviously it is desirable to be able to develop each series of pictures separately without relinquishing the advantage of being able to place double the length of film within the camera. This in turn includes the advantage of being able to use two strips of film having different emulsions and use them at will.

In view of this it is the object of this invention to provide a container or box adapted to contain two film casettes, each of which in turn is adapted to contain a strip of film of one half the standard width and therefore, of course, perforated at only one edge. In use the film container is attached to the camera with one of the casettes in picture taking position. When the film has been used or it is desired for any reason to use the other strip of film, the container is detached from the camera, inverted and then again attached to the camera with the other strip of film in picture taking position.

The invention is illustrated in the accompanying drawing in which

Figure 1 is a view of the film container in position upon the camera with parts in section and parts removed, the section being taken substantially on the line 1—1 of Figure 2.

Figure 2 is a sectional view of the film container taken substantially on the line 2—2 of Figure 3 with parts broken away.

Figure 3 is a front view of the container.

In the drawing the reference numeral 1 denotes a motion picture camera having an objective 2. The camera which is illustrated is of the type sometimes called coverless and the film container is attached to the outside, there being no cover to open. As shown, the camera is cut down as at 3—4 to provide a space for the film container or film box 5 which is placed upon the outside of the camera with a film in photographing position behind the objective. The film container is held attached to the camera by suitable lugs 21 on the container engaging corresponding openings 22 in the camera wall. The film container is in the form of a flat box having an open side at 6. The box is adapted to contain two film casettes 7 and 8 which are each also in the forms of a flat box. The casettes are inserted side by side through the open side 6 of the box 5. The latter is provided with a spring 9 which lies against the three sides of the box. The spring may be moved to the left from the position shown in Fig. 2 to extend partly outside the box through the side 6. For this purpose the spring has buttons 10 which project to the outside of the box through slots 30. Thus, if the box contains film casettes they will be pushed out of the box to be seized and removed. On the other hand if the box is empty, film casettes may be pushed into position against the back of the spring, the ends of which yield, and the casettes and the spring are then pushed into the box. The spring and the casettes have cooperating projections 31 and 32 respectively for retaining the casettes.

The casettes 7 and 8 are alike. Each of them is in the form of a flat box having a film window 11 in the front side through which the films are exposed. The casette 8 is provided with a winding off spool 12 and a winding up spool 13 for the film 14. In the other casette 7 the winding off spool is marked 15, the winding up spool is marked 16 and the film 17. The films are operated in the usual manner by a reciprocating film jaw or like member 18 operating through a cut out portion at 19. The box 5 has corresponding cut outs 20 for the same purpose. Each of the two casettes is provided with a film gate mechanism as indicated at 33 for supporting the film in the usual manner while an exposure is made. The film gate mechanism, of which only the one symmetrical half portion is shown in Fig. 2, includes a curved shield 35 which closes the interior of the casette lighttight as shown. The numerals 34 denote the usual film guiding members.

The operation is as follows: The box 5 is placed in position upon the camera and held firmly attached thereto by the lugs 21 on the box engaging corresponding openings 22 in the camera, see Figure 1. Through openings 23 in the box the usual film driving shaft 24 extends into engagement with the winding up spool. The film driving shaft 24 may be hand operated or otherwise operated depending upon the construction of the camera. No special operating means are shown. In Figure 1 the casette 8 with the film 14 is in photographing position in alinement with the axis of the objective. This film may now be exposed, the film being wound from the spool 12 and onto the spool 13, see Figure 2. When the entire film has been exposed or it is otherwise desired to change the films, the box 5 is detached from the camera, inverted and put back into position. Obviously the other casette 7 with the film 17 is now in photographing position, the film being wound from spool 15 to spool 16.

The film container according to this invention therefore includes a box having an open front and adapted to contain two film casettes, each of which contains a film half the width of a standard film. The casettes are placed within the box in such positions that the supply spool in the one casette is at one end of the box, the supply spool in the other casette is at the other end of the box. Hence when one film has been exposed, the box is detached, turned around and again secured to the camera. The second film will now be in correct position for taking the pictures.

A further advantage of the invention resides in the fact that after the film in one casette has been exposed, the casette may be removed in daylight and the film developed while the second film is being exposed. Again, it will be clear, that one film having a certain emulsion may be wholly or partly exposed and thereafter by a simple reversion of the film box the second film, in the other casette, and having an emulsion different from the first film may then be exposed.

I claim:—

1. A motion picture film container comprising a box having an open front, two film casettes in said box having film windows facing the front of the box, a supply spool of motion picture film supported in the lower half of the one casette and an empty winding up spool supported in the upper half thereof, another supply spool of motion picture film supported in the upper half of the other casette and an empty winding up spool supported in the lower half thereof and means for supporting the said box upon a motion picture camera in either one of two different positions to place either one of the casettes and its spool of film in photographing operative relation to the objective of a camera.

2. A motion picture film container comprising a box having an open front, two film casettes in said box having film windows facing the front of the box, a supply spool of motion picture film supported in the lower half of the one casette and an empty winding up spool supported in the upper half thereof, another supply spool of motion picture film supported in the upper half of the other casette and an empty winding up spool supported in the lower half thereof and means for supporting the said box upon a motion picture camera in either one of two different positions to place either one of the casettes and its spool of film in photographing operative relation to the objective of a camera, the said casettes being detachably held within the said box and spring means in the latter for projecting the casettes therefrom.

HELMUT BECKER.